US009181661B2

(12) United States Patent
Petersen (10) Patent No.: US 9,181,661 B2
(45) Date of Patent: Nov. 10, 2015

(54) SEALING SYSTEM FOR HITCH ASSEMBLY

(71) Applicant: Caterpillar Paving Products Inc., Brooklyn Park, MN (US)

(72) Inventor: Paul S. Petersen, Maple Grove, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 28 days.

(21) Appl. No.: 14/164,652

(22) Filed: Jan. 27, 2014

(65) Prior Publication Data

US 2015/0211194 A1 Jul. 30, 2015

(51) Int. Cl.
*E01C 19/28* (2006.01)
*E01C 19/26* (2006.01)
*F16J 15/16* (2006.01)
*B60D 1/58* (2006.01)
*B60D 1/02* (2006.01)
*B60D 1/00* (2006.01)

(52) U.S. Cl.
CPC . *E01C 19/26* (2013.01); *B60D 1/02* (2013.01); *B60D 1/58* (2013.01); *F16J 15/16* (2013.01); *B60D 2001/001* (2013.01)

(58) Field of Classification Search
CPC ............ E01C 19/26; F16J 15/16; B60D 1/02; B60D 1/58; B60D 2001/001
USPC .......................................... 404/117; 280/400
See application file for complete search history.

(56) References Cited

U.S. PATENT DOCUMENTS

| 3,411,809 | A | * | 11/1968 | Houtz et al. | 280/400 |
| 3,437,163 | A | * | 4/1969 | Lemmerman | 180/235 |
| 3,711,121 | A | * | 1/1973 | Molby | 280/400 |
| 3,844,046 | A | * | 10/1974 | Johnson | 33/199 R |
| 4,261,593 | A | * | 4/1981 | Yeager | 280/415.1 |
| 4,290,622 | A | * | 9/1981 | Horvath | 280/400 |
| 4,545,454 | A | * | 10/1985 | Bas | 180/420 |
| 5,327,996 | A | * | 7/1994 | Moller | 184/5 |
| 7,523,912 | B1 | * | 4/2009 | Woods | 248/415 |
| 8,276,867 | B2 | * | 10/2012 | Hung | 248/323 |

* cited by examiner

*Primary Examiner* — Raymond W Addie
(74) *Attorney, Agent, or Firm* — Andrew A. Phillips (57) ABSTRACT

A sealing system for a hitch assembly is disclosed. The hitch assembly includes a first hitch component and a second hitch component rotatable about a pin coupled therebetween. The sealing system includes a first sealing member located adjacent to the first hitch component. The first sealing member includes a first aperture extending therethrough. The sealing system also includes a second sealing member located adjacent to the second hitch component. The second sealing member includes a second aperture extending therethrough. The sealing system further includes at least one ring member provided between the first sealing member and the second sealing member. The ring member includes a third aperture extending therethrough. Further, the first, second and third apertures receive the pin therethrough.

6 Claims, 6 Drawing Sheets

SEALING SYSTEM FOR HITCH ASSEMBLY

TECHNICAL FIELD

The present disclosure relates to a sealing system, and more specifically to a sealing system for a hitch assembly.

BACKGROUND

Articulated machines are well known in the art. Examples of such articulated machines include compactors, articulated trucks and wheel loaders. Articulated machines typically include two frames connected by a hitch assembly. The hitch assembly includes two hitch components rotatably coupled by one or more pins. A bearing is provided around the pins to enable relative rotation between the two hitch components. During operation of the articulated machine, the bearing may be contaminated by foreign material. Foreign material may contaminate a lubricant present in the bearing and abrade the bearing. This may cause premature wear of the bearing. Therefore, a life of the bearing may be reduced due to such contamination.

Known methods to protect the bearing from foreign material include providing a lip seal on the hitch assembly. However, the hitch components may oscillate relative to each other during operation of the articulated machine. The lip seal may be unable to prevent foreign material from entering the bearing during such oscillations.

SUMMARY OF THE DISCLOSURE

In one aspect of the present disclosure, a sealing system for a hitch assembly is disclosed. The hitch assembly includes a first hitch component and a second hitch component rotatable about a pin coupled therebetween. The sealing system includes a first sealing member. The first sealing member includes a first aperture extending therethrough. The sealing system also includes a second sealing member. The second sealing member includes a second aperture extending therethrough. The sealing system further includes at least one ring member provided between the first sealing member and the second sealing member. The ring member includes a third aperture extending therethrough. Further, the first, second and third apertures receive the pin therethrough.

In another aspect, a hitch assembly of a machine is disclosed. The hitch assembly includes a first hitch component, a second hitch component, and a pin coupled to the first hitch component and the second hitch component. Further, the first hitch component and the second hitch component are rotatable about the pin. The hitch assembly also includes a bearing system mounted on the pin. The hitch assembly further includes a sealing system mounted on the pin. The sealing system includes a first sealing member. The first sealing member includes a first aperture extending therethrough. The sealing system also includes a second sealing member. The second sealing member includes a second aperture extending therethrough. The sealing system further includes at least one ring member provided between the first sealing member and the second sealing member. The ring member includes a third aperture extending therethrough. Further, the first, second and third apertures receive the pin therethrough.

In yet another aspect, a compactor is disclosed. The compactor includes a first frame. The first frame includes a first compacting member and a first hitch component. The compactor also includes a second frame. The second frame includes a second compacting member and a second hitch component. The compactor includes a pin which is coupled to the first hitch component and the second hitch component. The first hitch component and the second hitch component are rotatable about the pin. The compactor also includes a bearing system mounted on the pin. The compactor further includes a sealing system mounted on the pin. The sealing system includes a first sealing member. The first sealing member includes a first aperture extending therethrough. The sealing system also includes a second sealing member. The second sealing member includes a second aperture extending therethrough. The sealing system further includes at least one ring member provided between the first sealing member and the second sealing member. The ring member includes a third aperture extending therethrough. Further, the first, second and third apertures receive the pin therethrough.

DETAILED DESCRIPTION

Figure 1:
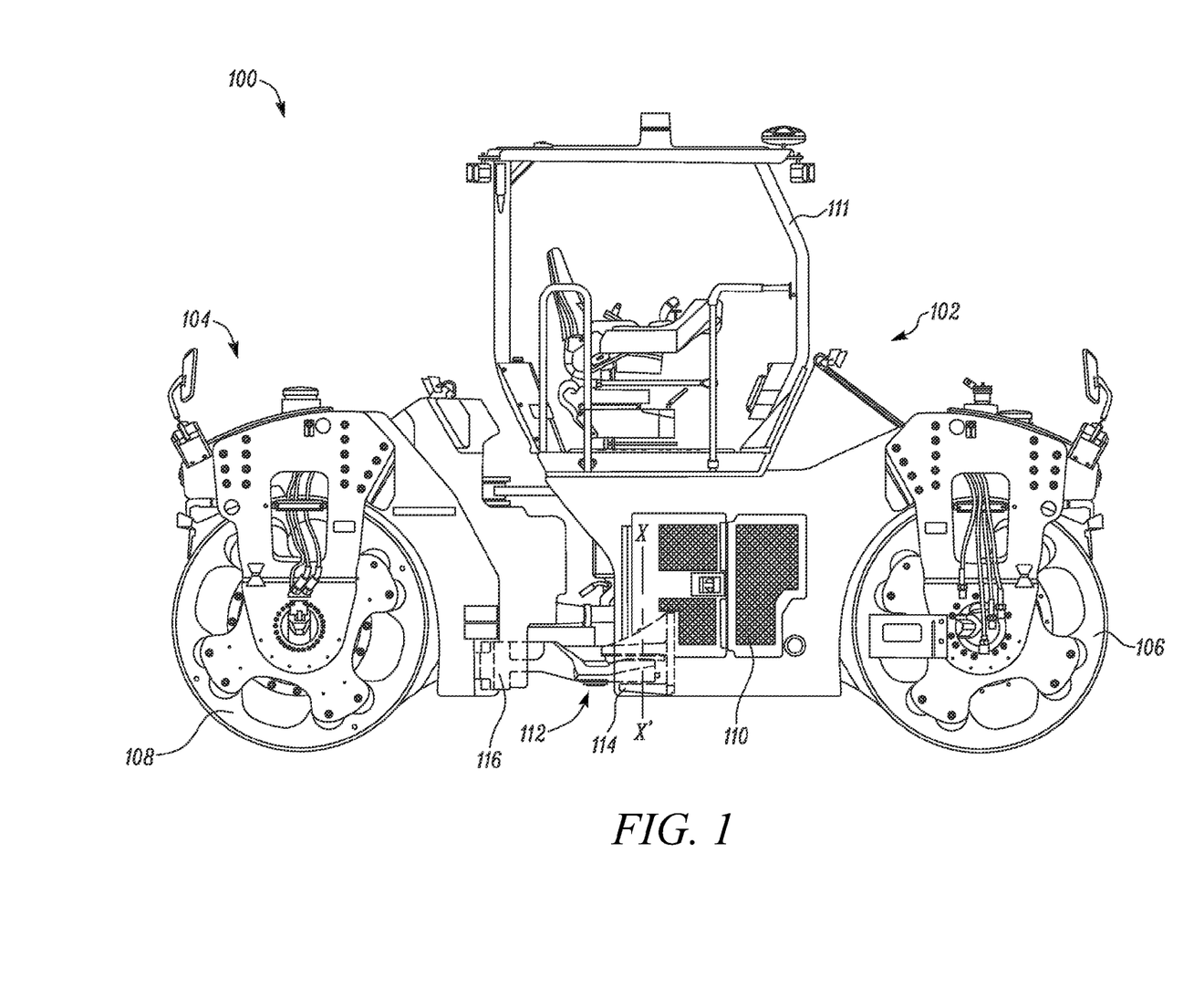
FIG. 1 is a side view of an exemplary compactor machine having a hitch assembly, according to one embodiment of the present disclosure.

Referring to FIG. 1, an exemplary machine 100 is illustrated. The machine 100 is embodied as a compactor in FIG. 1. More specifically, the machine 100 is a vibratory asphalt compactor. The machine 100 is configured to compact and finish an asphalt/bitumen mixture for paving a road surface (not shown). Alternatively, the machine 100 may also be a soil compactor, a landfill compactor, and so on. It should be noted that the machine 100 may also include any other industrial machine including, but not limited to, a wheel loader, a motor grader, an articulated truck, an agricultural tractor, and so on. The machine 100 may also include any machine with a towed implement or a trailer. In another embodiment, the machine 100 may be one of various types of machinery used in a number of industries such as mining, agriculture, construction, forestry, waste management, and material handling, among others.

The machine 100 includes a first frame 102 and a second frame 104. The first frame 102 and the second frame 104 include a first compacting member 106, and a second compacting member 108, respectively. The first and second compacting members 106, 108 may be configured to compact the asphalt/bitumen mixture for paving the road surface. Further, the first and second compacting members 106, 108 may be provided with vibratory mechanisms (not shown). In the illustrated embodiment, the first and second compacting member 106, 108 are embodied as smooth drums. Alternatively, the first and/or second compacting members 106, 108 may be padfoot drums, pneumatic members, and so on.

The first frame 102 also includes an enclosure 110 that houses a power source. The power source may be any internal combustion engine known in the art powered by a fuel including, but not limited to, gasoline, diesel, natural gas and/or a combination thereof. In an embodiment, the internal combustion engine may drive an electrical generator. Alternatively, the power source may include batteries, an electric motor, and so on. The power source is configured to provide power to the machine 100 for mobility and/or other operational needs. The enclosure 110 may also house various other components required for operational control of the machine 100 including, but not limited to, electrical and/or electronic components, hydraulic and/or pneumatic components. Further, a cabin 111 for an operator may be provided on the first frame 102 of the machine 100. The cabin 111 may be equipped with various control levers, such as a joystick, and switches for the operation and control of the machine 100.

In an embodiment, the first frame 102 and the second frame 104 are connected by a hitch assembly 112. The hitch assembly 112 may enable the first frame 102 and the second frame 104 to articulate relative to each other about an articulating axis X-X'. Further, the hitch assembly 112 includes a first hitch module 114 coupled to the first frame 102, and a second hitch module 116 coupled to the second frame 104. Various details of the hitch assembly 112 will be described hereinafter.

Figure 2:
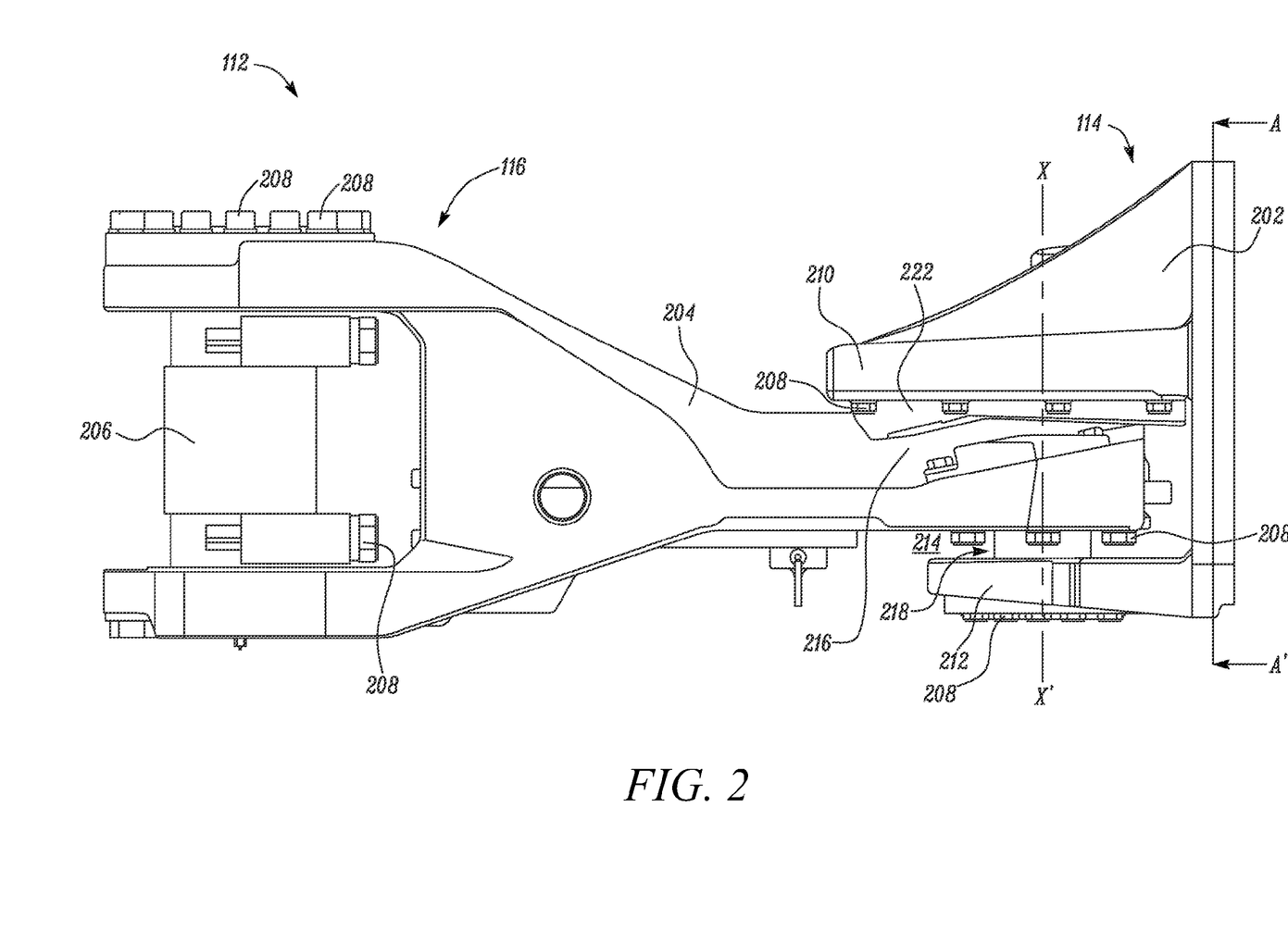
FIG. 2 is a side view of the hitch assembly, according to an embodiment of the present disclosure.

FIG. 2 illustrates a side view of the hitch assembly 112, according to an embodiment of the present disclosure. As illustrated in FIG. 2, the first hitch module 114 includes a first hitch component 202. The first hitch component 202 may be coupled to the first frame 102 (shown in FIG. 1) by one or more fasteners (not shown). Alternatively, the first hitch component 202 may be joined to the first frame 102 by any other method known in the art, for example, welding, brazing, and so on. The second hitch module 116 includes a second hitch component 204 and a joining member 206. The joining member 206 may be coupled to the second hitch component 204 by fasteners 208. Further, the joining member 206 may couple the second hitch component 204 to the second frame 104. The joining member 206 may be coupled to the second frame 104 by any method known in the art, for example, fasteners, welding, brazing, and so on. Alternatively, the joining member 206 may not be present and the second hitch component 204 may be directly joined to the second frame 104 by any method known in the art. In an embodiment, the first and/or second hitch components 202, 204 may be formed as a single piece by casting. It may also be contemplated that the first and/or second hitch components 202, 204 may be integrally formed with the first and second frames 102, 104, respectively.

The first hitch component 202 includes a first extending portion 210 and a second extending portion 212 that define an opening 214 therebetween. The opening 214 may receive a connecting portion 216 of the second hitch component 204. Further, the connecting portion 216 is coupled to the first and second extending portions 210, 212 by an articulating joint 218 (explained in detail with reference to FIGS. 3 and 4). The articulating joint 218 may enable the first and second hitch components 202, 204 to be rotatable relative to each other about the articulating axis X-X'. The fasteners 208 may connect various components of the articulating joint 218 to the first and second hitch components 202, 204. Moreover, the connecting portion 216 of the second hitch component 204 is also received between two projections 222 (one shown in FIG. 2) of the first extending portion 210. The projections 222 may substantially restrict movement of the second hitch component 204 along a lateral direction which is perpendicular to the articulating axis X-X'. The projections 222 may therefore reduce oscillations, along the lateral direction, of the first hitch component 202 relative to the second hitch component 204 during operation of the machine 100.

Figure 3:
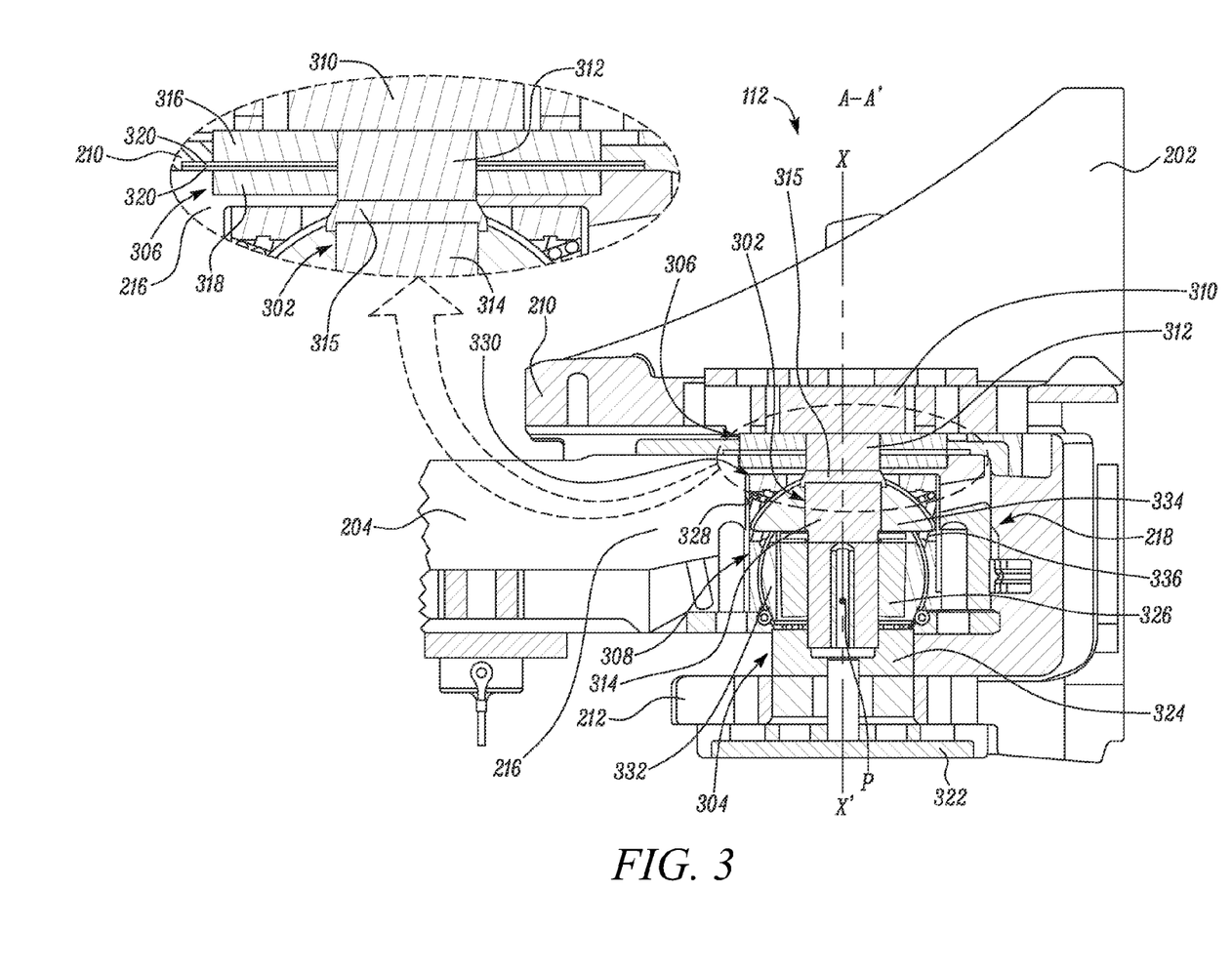
FIG. 3 is a partial sectional view of the hitch assembly about an axis A-A', according to an embodiment of the present disclosure.
Figure 4:
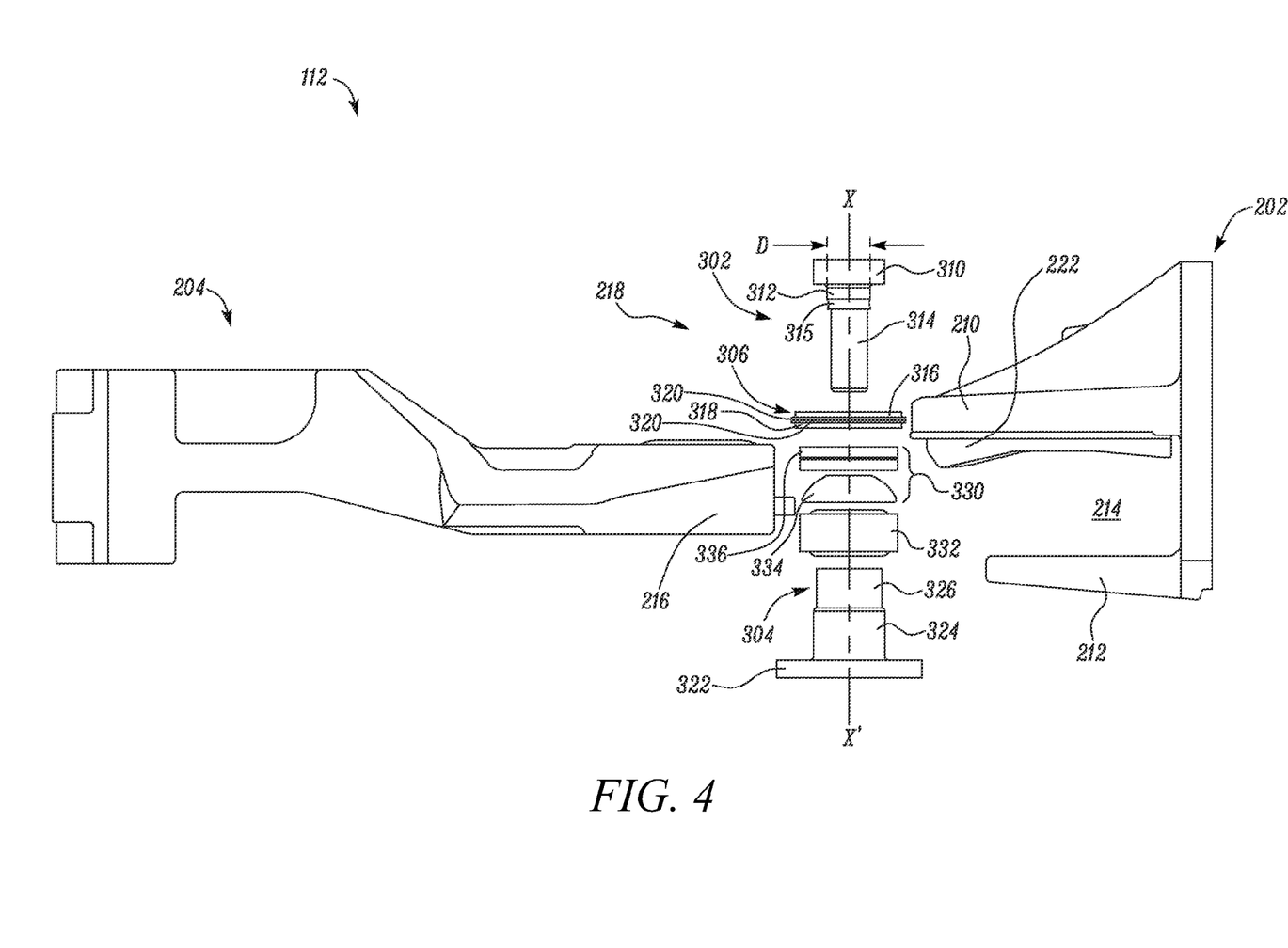
FIG. 4 is an exploded side view of the hitch assembly with some components removed, according to an aspect of the present disclosure.

FIG. 3 illustrates a partial sectional view of the hitch assembly 112, according to an embodiment of the present disclosure along an axis A-A'. FIG. 4 illustrates an exploded view of the hitch assembly 112, according to an embodiment of the present disclosure. Some components of the hitch assembly 112 have not been shown in FIG. 4 because of clarity. As shown in FIGS. 3 and 4, the articulating joint 218 includes a first pin 302, a second pin 304, a sealing system 306 and a bearing system 308. The first pin 302 includes a head 310, an intermediate portion 312, an elongated portion 314, and a protrusion 315 between the intermediate portion 312 and the elongated portion 314. A diameter of the elongated portion 314 may be lesser than a diameter D (shown in FIG. 4) of the intermediate portion 312. The head 310 of the first pin 302 may be received within a recess (not shown) of the first extending portion 210 of the first hitch component 202. Further, the first pin 302 may be secured between two flanges (not shown) in the first extending portion 210. The fasteners 208 (shown in FIG. 2) may couple the two flanges to one another. Further, the sealing system 306 is mounted on the intermediate portion 312 of the first pin 302.

As shown in FIG. 3, the sealing system 306 is provided between the first extending portion 210 of the first hitch component 202 and the connecting portion 216 of the second hitch component 204. Further, the sealing system 306 may be retained between the head 310 and the protrusion 315 of the first pin 302 as the head 310 and the protrusion 315 have larger diameters with respect to the intermediate portion 312 of the first pin 302. In an embodiment, the sealing system 306 includes a first sealing member 316, a second sealing member 318, and two ring members 320 provided between the first and second sealing members 316, 318. The first sealing member 316 is located adjacent to the first extending portion 210 of the first hitch component 202. The second sealing member 318 is located adjacent to the connecting portion 216 of the second hitch component 204. The first sealing member 316, the second sealing member 318, and the ring members 320 coaxially receive the intermediate portion 312 of the first pin 302. In an embodiment, the first and second sealing members 316, 318 may be configured to deform in response to a relative movement between the first hitch component 202 and the second hitch component 204 along a longitudinal direction of the first pin 302.

The second pin 304 includes a head 322, a first portion 324 and a second portion 326. A diameter of the first portion 324 may be greater than a diameter of the second portion 326. The elongated portion 314 of the first pin 302 is at least partially received within the first and second portions 324, 326 of the second pin 304. Further, the head 322 and the first portion 324 of the second pin 304 are at least partly received within a recess (not shown) of the second extending portion 212. Further, the second pin 304 may be secured between two flanges (not shown) in the second extending portion 212. The fasteners 208 (shown in FIG. 2) may couple the two flanges to one another. The first and second hitch components 202, 204 may therefore be coupled to each other by the first and second pins 302 and 304. Further, the first and second hitch components 202, 204 are rotatable about the first and second pins 302, 304 which are coaxially mounted with respect to the articulating axis X-X'. Thus, the longitudinal direction of each of the first and second pins 302, 304 may be parallel to the articulating axis X-X'.

As illustrated in FIG. 3, the various components of the bearing system 308 are received within a recess 328 of the connecting portion 216 of the second hitch component 204. In an embodiment, the sealing system 306 may be configured to seal an opening of the recess 328. The bearing system 308 may be co-axially mounted relative to the articulating axis X-X'. The bearing system 308 may be mounted on the first and second pins 302, 304. Moreover, the elongated portion 314 of the first pin 302 and the second portion 326 of the second pin 304 are at least partially received within the recess 328. In an embodiment, the bearing system 308 includes a thrust bearing 330 and a radial bearing 332. The thrust bearing 330 may be configured to support axial loads substantially parallel to the articulating axis X-X'. The radial bearing 332 may be configured to support radial loads substantially perpendicular to the articulating axis X-X'. The thrust bearing 330 further includes an inner race 334 and an outer race 336. Rolling elements (E.g., balls, rollers etc.) may be provided between the inner race 334 and the outer race 336. In various embodiments, the thrust bearing 330 and the radial bearing 332 may include ball bearings, tapered roller bearings, cylindrical roller bearings, spherical roller bearings, and so on. The inner race 334 is mounted on the elongated portion 314 of the first pin 302. Moreover, the inner race 334 is enclosed by the outer race 336. The radial bearing 332 is mounted on the second portion 326 of the second pin 304. The recess 328 may further contain a lubricant. The fasteners 208 (shown in FIG. 2) may secure the bearing system 308 along with portions of the first and second pins 302, 304 to the connecting portion 216. Further, the articulating joint 218 may have a rotation point "P" located within the connecting portion 216 of the second hitch component 204. The rotation point "P" may be offset, relative to the sealing system 306, along the articulating axis X-X' due to the two-pin design of the articulating joint 218.

The hitch assembly 112, as described above, is exemplary in nature and alternative configurations are possible within the scope of the present disclosure. For example, a single pin (not shown) may rotatably couple the first hitch component 202 to the second hitch component 204. Further, only a single bearing may be provided to support both axial and radial loads.

Figure 5:
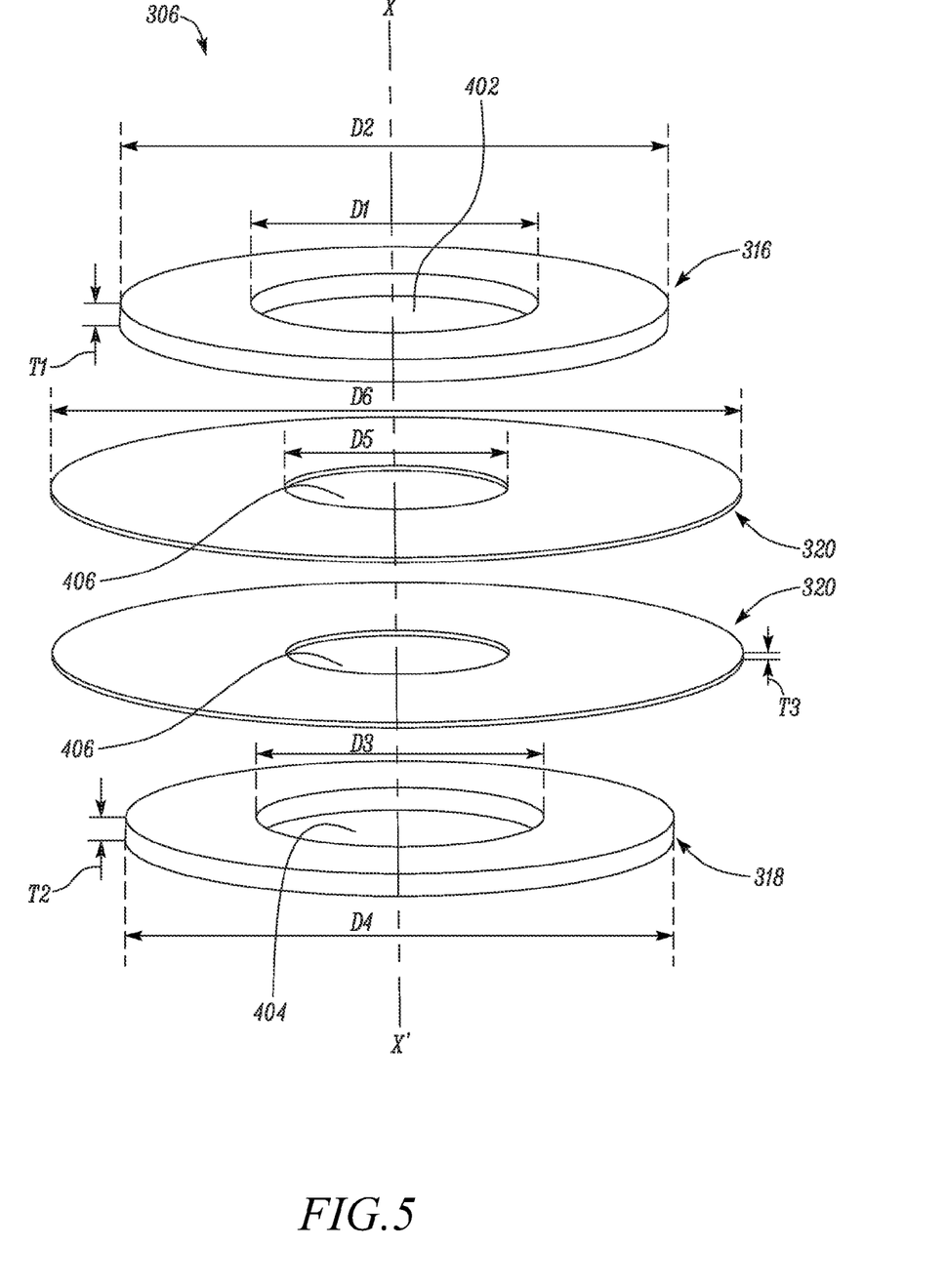
FIG. 5 is an exploded perspective view of a sealing system, according to an embodiment of the present disclosure.

FIG. 5 illustrates an exploded view of the sealing system 306, according to an embodiment of the present disclosure. As illustrated in FIG. 5, the sealing system 306 includes the first sealing member 316, the second sealing member 318, and the two ring members 320 provided between the first and second sealing members 316, 318. The first and second sealing members 316, 318 include first and second apertures 402, 404, respectively. Each of the ring members 320 includes a third aperture 406. The first, second and third apertures 402, 404 and 406 receive the intermediate portion 312 (shown in FIG. 3) of the first pin 302.

As illustrated in FIG. 5, the first sealing member 316 has an inner diameter D1, an outer diameter D2, and a thickness T1. The inner diameter D1 of the first sealing member 316 may be equal to a diameter of the first aperture 402. Similarly, the second sealing member 318 has an inner diameter D3, an outer diameter D4, and a thickness T2. The inner diameter D3 of the second sealing member 318 may be equal to a diameter of the second aperture 404. Each of the ring members 320 has an inner diameter D5, an outer diameter D6 and a thickness T3. The inner diameter D5 of each of the ring members 320 may be equal to a diameter of the third aperture 406.

In an embodiment, the first and second sealing members 316, 318 may have substantially the same dimensions. Therefore, the inner diameter D1, the outer diameter D2, and the thickness T1 of the first sealing member 316 may be substantially equal to the inner diameter D3, the outer diameter D4 and the thickness T2 of the second sealing member 318. Further, the inner diameters D1 and D3 may be substantially equal to an outer diameter D (shown in FIG. 4) of the intermediate portion 312 of the first pin 302. Alternatively, the inner diameters D1 and D3 may be slightly lesser than the outer diameter D of the intermediate portion 312 in order to form an interference fit between the first and second sealing members 316, 318, and the intermediate portion 312. In an alternate embodiment, the first and second sealing members 316, 318 may have different dimensions. For example, the outer diameters D2 and D4, and/or the thicknesses T1 and T2 may be different.

The thicknesses T1 and T2 of the first and second sealing members 316, 318, respectively, is greater than the thickness T3 of each of the ring members 320. Further, the outer diameters D2 and D4 of the first and second sealing members 316, 318, respectively, is lesser than the outer diameter D6 of each of the ring members 320. In an embodiment, the inner diameter D5 of each of the ring members 320 is lesser than the outer diameter D of the intermediate portion 312 of the first pin 302. Further, each of the ring members 320 is mounted elastically around the intermediate portion 312. This may result in a secure fit and minimal clearance between each of the ring members 320 and the intermediate portion 312. In an embodiment, each of the ring members 320 may be identical to one another. In an alternative embodiment, each of the ring members 320 may have different dimensions. It may also be contemplated that the sealing system 306 may have any number of the ring members 320 between the first and second sealing members 316, 318. For example, only one ring member 320 may be provided.

In an embodiment, the first and second sealing members 316, 318 may be made of polyurethane. The polyurethane may be in the form of microcellular foam. In another embodiment, each of the ring members 320 may be made of nylon. The nylon may include any variant of nylon know in the art, for example, nylon-6, nylon-6,6 and so on. The first and second sealing members 316, 318, and the ring members 320 may be manufactured by various processes known in the art, for example, injection molding. One or more additives, such as blowing agents, may be also be added during manufacturing of the first and second sealing members 316, 318.

The various components of the sealing system 306, as described above, are exemplary in nature, and alternative configurations are possible within the scope of the present disclosure. The shapes and dimensions of the first and second sealing members 316, 318, and the ring members 320 may vary as per system requirements. For example, the first, second and third apertures 402, 404, 406 may be of any shape other than circular, such as elliptical, polygonal, and the like. Further, the first and second sealing members 316, 318, and the ring members 320 may also have outer boundaries of any shape other than circular, for example, elliptical, polygonal, and the like. The cross-sections of the first and second sealing members 316, 318, and the ring members 320 may also vary along the respective thicknesses.

INDUSTRIAL APPLICABILITY

A hitch assembly of an articulated machine includes a bearing. The bearing may be contaminated by foreign material during an operation of the articulated machine. Foreign material may include water, oil, debris, and so on. Such contamination may reduce a life of the bearing.

The sealing system 306, as disclosed herein, may prevent foreign material from contacting of the bearing system 308 of the hitch assembly 112. The hitch assembly 112 may be used in any articulated machine, for example, but not limited to, a compactor, a wheel loader, a motor grader, an articulated truck, and the like. The hitch assembly 112 may also be provided between a machine and a towed body, such as an agricultural tractor and a towed implement.

Figure 6:
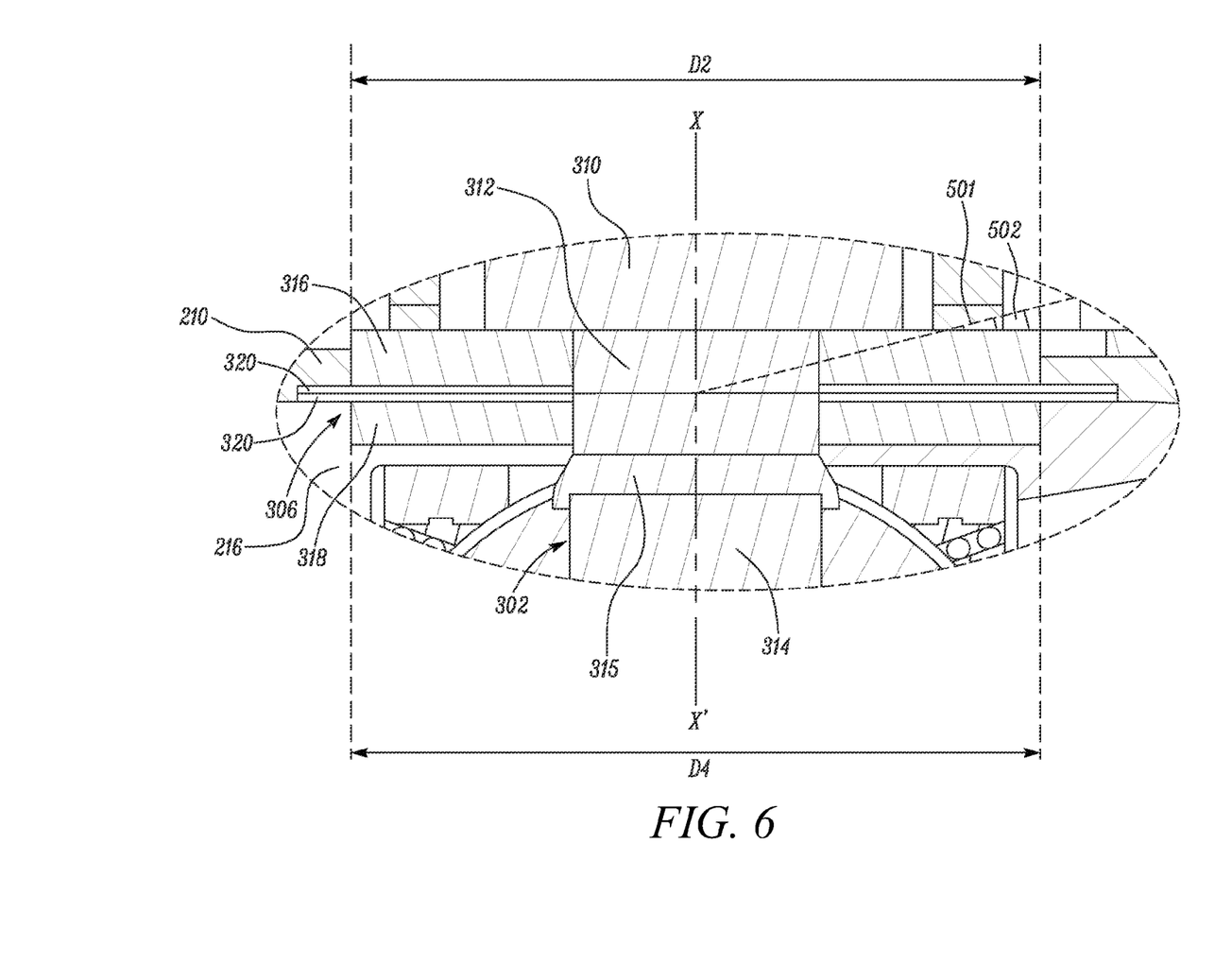
FIG. 6 is a detailed view of the sealing system within the hitch assembly of FIG. 3.

An exemplary operation of the sealing system 306 will be described hereinafter with reference to FIG. 6. Reference will also be made to FIGS. 1 to 5. During operation of the machine 100, the first hitch component 202 and the second hitch component 204 may oscillate relative to one another. Such oscillations may be due to an uneven ground surface, vibrations of various components of the machine 100, and so on. Such oscillations may include relative movements of the first and second hitch components 202, 204 along a longitudinal direction, which is parallel to the articulating axis X-X', of the first and second pins 302, 304. The projections 222 of the first hitch component 202 may reduce relative movement of the first and second hitch components 202, 204 along the lateral direction perpendicular to the longitudinal direction. However, movements along the longitudinal direction may not be reduced.

The first hitch component 202 may be displaced towards the second hitch component 204 along the longitudinal direction of the first pin 302. This movement is shown schematically by a dashed line 501 in FIG. 6. Further, the movement of the first hitch component 202 may create a void 502 adjacent to an upper surface of the first sealing member 316. The first sealing member 316 may deform and fill the void 502. The first sealing member 316 may be deformable due to elastomeric properties of polyurethane. It may be contemplated that the second sealing member 318 may also deform to fill any void due to movements of the second hitch component 204 along the longitudinal direction. The first and second sealing members 316, 318 may revert to original shapes once the first and second hitch components 202, 204 move back to original positions. The movements of the first and second hitch components 202, 204 adjacent to the sealing system 306 may also be of greater magnitudes as the sealing system 306 is offset relative to the rotation point "P" of the articulating joint 218. The sealing system 306 may be able to accommodate such movements of the first and second hitch components 202, 204. For example, the first and second sealing members 316, 318 may be able to fill voids having radial lengths up to half of the outer diameters D2 and D4, respectively. Further, the first and second sealing members 316, 318 may be able to accommodate movements of the first and second hitch components 202, 204, respectively, that result in angles of up to 6 degrees with respect to a radial direction.

Therefore, the sealing system 306 may form a compression seal that is able to seal any voids caused by the oscillations of the first and second hitch components 202, 204. This may prevent any entry of foreign material into the bearing system 308. The bearing system 308 may therefore have an increased life requiring minimal maintenance. The ring members 320 may further seal any clearance between the intermediate portion 312 of the first pin 302 and the sealing system 306. The ring members 320 may also seal any clearance between the first and second sealing members 316, 318. Such a clearance may be caused due deformations of the first and second sealing members 316, 318. The greater value of the outer diameter D6 of the ring members 320 may also facilitate sealing between the first and second sealing members 316, 318. The ring members 320 may reduce wear of the first and second sealing members 316, 318 by preventing contact between them. The ring members 320 may also act as spacers between the first and second sealing members 316, 318. A number of the ring members 320 may therefore be varied as per system requirements. The first and second sealing members 316, 318, and the ring members 320 may be easily molded from polymeric material, such as polyurethane and nylon. Therefore, a shape and dimensions of the first and second sealing members 316, 318, and the ring members 320 may be conveniently changed as per system requirements.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A compactor comprising:
   a first frame comprising a first compacting member and a first hitch component;
   a second frame comprising a second compacting member and a second hitch component;
   a pin coupled to the first and the second hitch components, wherein the first hitch component and the second hitch component are rotatable about the pin;
   a bearing system mounted on the pin; and
   a sealing system mounted on the pin, the sealing system comprising:
      a first sealing member comprising a first aperture extending therethrough;
      a second sealing member comprising a second aperture extending therethrough; and
      at least one ring member provided between the first sealing member and the second sealing member, the ring member comprising a third aperture extending therethrough;
      wherein the first, second and third apertures receive the pin therethrough.

2. The compactor of claim 1, wherein the first sealing member and the second sealing member are configured to selectively deform in response to a relative movement between the first hitch component and the second hitch component along a longitudinal direction of the pin.

3. The compactor of claim 1, wherein the first sealing member and the second sealing member are made of polyurethane.

4. The compactor of claim 1, wherein the ring member is made of nylon.

5. The compactor of claim 1, wherein the sealing system comprises two ring members provided between the first and the second sealing member.

6. The compactor of claim 1, wherein a thickness of each of the first sealing member and the second sealing member is greater than a thickness of the ring member.

* * * * *